US011193631B2

(12) United States Patent
Takezawa

(10) Patent No.: US 11,193,631 B2
(45) Date of Patent: Dec. 7, 2021

(54) FILLING DEVICE

(71) Applicant: TATSUNO CORPORATION, Tokyo (JP)

(72) Inventor: Masahiro Takezawa, Tokyo (JP)

(73) Assignee: TATSUNO CORPORATION, Tokyo (JP)

(*) Notice: Subject to any disclaimer, the term of this patent is extended or adjusted under 35 U.S.C. 154(b) by 0 days.

(21) Appl. No.: 16/963,473

(22) PCT Filed: Nov. 13, 2018

(86) PCT No.: PCT/JP2018/041989
§ 371 (c)(1),
(2) Date: Jul. 20, 2020

(87) PCT Pub. No.: WO2019/155708
PCT Pub. Date: Aug. 15, 2019

(65) Prior Publication Data
US 2020/0386368 A1  Dec. 10, 2020

(30) Foreign Application Priority Data
Feb. 9, 2018  (JP) .............................. JP2018-021617

(51) Int. Cl.
*F17C 5/00* (2006.01)
*B60K 15/03* (2006.01)

(52) U.S. Cl.
CPC .............. *F17C 5/007* (2013.01); *B60K 15/03* (2013.01); *B60K 2015/03315* (2013.01);
(Continued)

(58) Field of Classification Search
CPC .......... F17C 13/04; F17C 5/06; F17C 13/002; F17C 2205/0323; F17C 2205/037;
(Continued)

(56) References Cited

U.S. PATENT DOCUMENTS 1,637,325 A * 7/1927 Jacques ................... F16N 21/04
141/351
2,548,528 A * 4/1951 Hansen ................... F16L 37/23
251/149.6
(Continued)

FOREIGN PATENT DOCUMENTS

EP  1437543 A1  7/2004
EP  3324097 A1  5/2018
(Continued)

OTHER PUBLICATIONS

International Search Report for PCT/JP2018/041989; dated Dec. 2, 2019.
European Search Report for EP 18 90 5478; dated Jun. 23, 2021.

*Primary Examiner* — Timothy L Maust
*Assistant Examiner* — James R Hakomaki
(74) *Attorney, Agent, or Firm* — Stetina Brunda Garred & Brucker

(57) ABSTRACT

To provide a filling apparatus capable of suppressing radial movement of a rod-shaped member (connecting pin) of a nozzle, and preventing damages and deformations (recesses and so on) from generating on an outer peripheral surface of the connecting pin. A filling apparatus (100) according to the present invention includes: a storage tank for storing hydrogen fuel; a filling nozzle (10) for filling a hydrogen gas from the storage tank through a fuel filling system to an in-vehicle hydrogen filling tank mounted on a vehicle; a rod-shaped member (2: connecting pin) and a main body portion (1) mounted on the filling nozzle (10); a sealing member (3: laminated sealing member) arranged on (a radially outer peripheral portion of the rod-shaped member of) the main body portion (1); a guide member (4: pressing member), projecting radially inward, mounted on a portion separated from an end side of the rod-shaped member (2) (from a receptacle 20 side in an in-vehicle hydrogen filling tank to (Continued)

the fuel filling system); and means for protecting an outer peripheral surface of the rod-shaped member (2) from slide on the guide member (4).

11 Claims, 2 Drawing Sheets

(52) U.S. Cl.
CPC *F17C 2205/0376* (2013.01); *F17C 2221/012* (2013.01); *F17C 2270/0168* (2013.01)

(58) Field of Classification Search
CPC .......... F17C 2221/012; F17C 2260/036; F17C 2265/065; F17C 2270/0168; F17C 13/00; B67D 7/42; Y02E 60/32; F16J 15/06; F16J 15/061
USPC ........................................................ 141/351
See application file for complete search history.

(56) References Cited

U.S. PATENT DOCUMENTS

| | | | |
|---|---|---|---|
| 3,715,099 A * | 2/1973 | Shendure | F16L 37/40 251/149.1 |
| 4,458,719 A * | 7/1984 | Strybel | F16L 37/127 137/614.03 |
| 6,343,630 B1 | 2/2002 | Dubinsky | |
| 6,561,551 B2 * | 5/2003 | Kawakami | F16L 37/23 285/307 |
| 6,792,974 B2 * | 9/2004 | Mikiya | F16L 37/34 137/614.03 |
| 7,028,724 B2 * | 4/2006 | Cohen | F02M 21/0221 141/94 |
| 7,926,783 B1 * | 4/2011 | Liu | F16L 37/23 251/149.9 |
| 8,256,803 B2 * | 9/2012 | Takahashi | F16L 37/23 285/316 |
| 8,766,843 B2 * | 7/2014 | Ueno | H01L 27/14601 341/169 |
| 9,080,712 B2 * | 7/2015 | Tiberghien | F16L 55/10 |
| 9,404,622 B2 * | 8/2016 | Ozaki | H01M 8/04201 |
| 10,093,532 B2 * | 10/2018 | Ballard | F16L 37/36 |
| 2007/0155224 A1 | 7/2007 | Marot et al. | |
| 2016/0010798 A1 | 1/2016 | Hori et al. | |
| 2016/0178126 A1 | 6/2016 | Lee | |

FOREIGN PATENT DOCUMENTS

| | | |
|---|---|---|
| JP | 2001343022 A | 12/2001 |
| JP | 2004052996 A | 2/2004 |
| JP | 2004293777 A | 10/2004 |
| JP | 200569361 A | 3/2005 |
| JP | 2009156371 A | 7/2009 |
| JP | 2010133497 A | 6/2010 |
| JP | 2014109350 A | 6/2014 |

* cited by examiner

[Fig. 1]
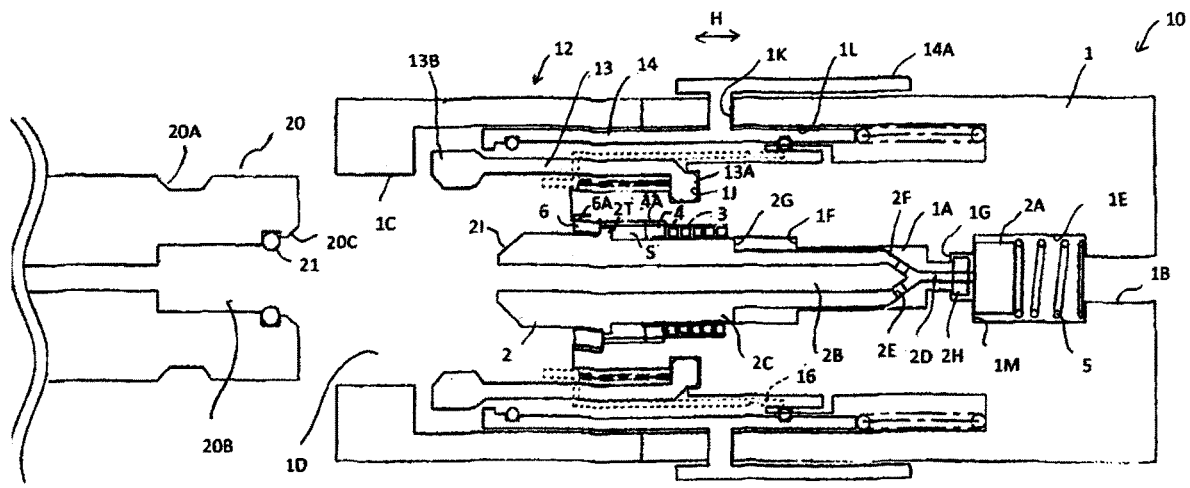
[Fig. 2]
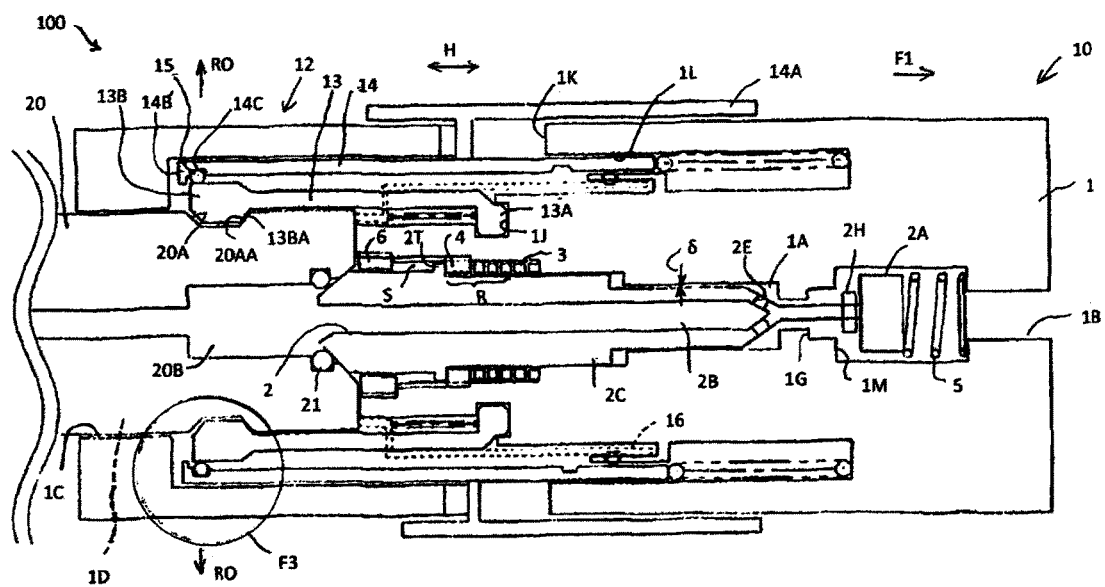

[Fig. 3]
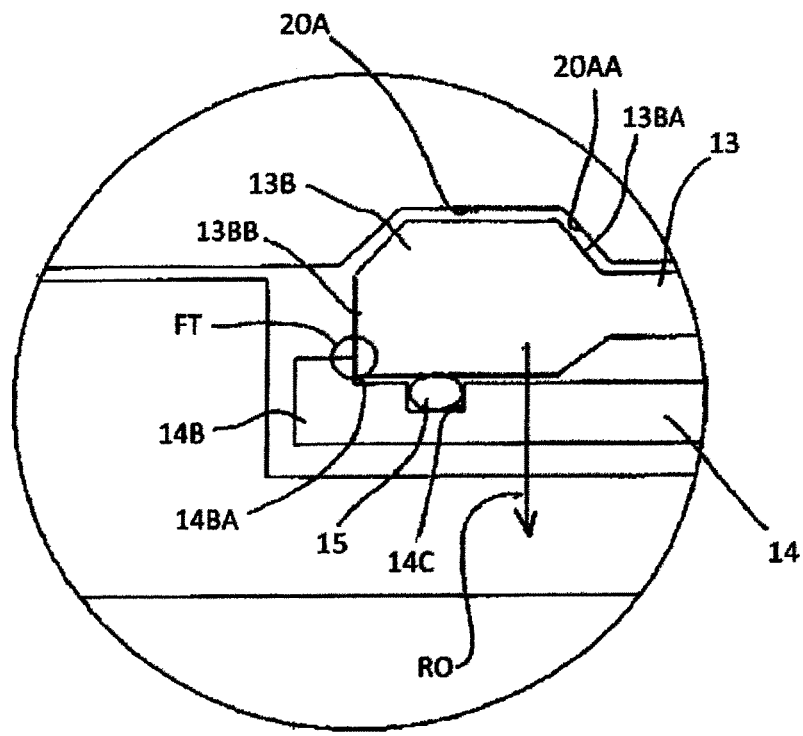
[Fig. 4]
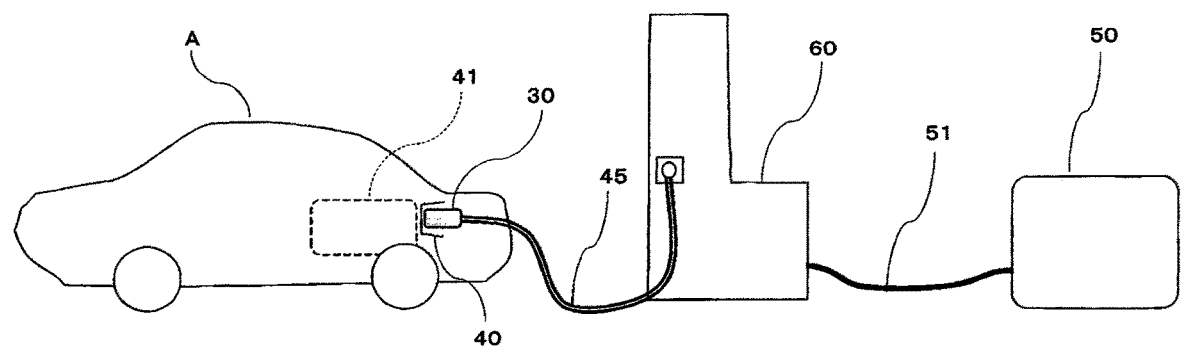

FILLING DEVICE

CROSS-REFERENCE TO RELATED APPLICATIONS

The present application claims priority to International Application No. PCT/JP2018/041989 filed on Nov. 13, 2018, which claims priority to Japanese Patent Application No. 2018-021617 filed on Feb. 9, 2018, the disclosures of which are incorporated herein by reference.

STATEMENT RE: FEDERALLY SPONSORED RESEARCH/DEVELOPMENT

Not Applicable

BACKGROUND

1. Technical Field of the Invention

The present invention relates to a filling apparatus for filling a gas such as hydrogen gas used for fuel or the like.

2. Description of the Related Art

For example, to a vehicle using a hydrogen gas as fuel, as shown in FIG. 4, at a hydrogen filling station with a hydrogen storage tank 50 and a fuel filling system (having a dispenser 60, a filling hose 45 and so on) is filled a hydrogen gas after a filling nozzle 30 and a receptacle 40 (vehicle side socket: filling port) are connected with each other. In FIG. 4, the numeral 51 shows a piping system for feeding a hydrogen gas from the hydrogen storage tank 50 to the dispenser 60. This type of hydrogen filling apparatus has already been proposed by the present applicant in Patent document 1 for instance, and the apparatus is effective.

In a conventional hydrogen filling apparatus, when a nozzle of the hydrogen filling apparatus and a receptacle are connected with each other, a connecting pin of the nozzle is pressed by the receptacle to open a valve, and a hydrogen gas flows on the receptacle side. Then, in order to prevent a hydrogen gas from leaking via an outer peripheral surface of the connecting pin, a laminated sealing member (cup seal) is mounted. Here, in order to suppress radial movement of the connecting pin of the nozzle (so-called "rattling") and properly connect the nozzle with the receptacle, in the conventional hydrogen filling apparatus, in a main body portion on the nozzle side is mounted a guide member projecting in a radially inner direction of the main body portion, and slide of the connecting pin on an inner peripheral surface of the guide member suppresses radial movement of the connecting pin.

However, since the radially inner peripheral surface of the guide member and the connecting pin slide with each other, repetition of opening and closing of the valve causes a sliding portion to be damaged and deformed (recessed for instance). Then, there is a problem that the damages and the deformations on a radially inner side region of the laminated seal cause leakage of a hydrogen gas that should be filled outside the nozzle through the damages and the deformations. In the above hydrogen filling apparatus (refer to Patent document 1), solutions to the problems are not described at all.

Patent document 1: Japanese Patent Publication No. 2014-109350 gazette.

BRIEF SUMMARY

The present invention has been proposed in consideration of the above problems in the prior art, and the object thereof is to provide a filling apparatus capable of suppressing radial movement of a connecting pin of a nozzle, and preventing leakage of a hydrogen gas through damages and deformations (recesses and so on) generated on an outer peripheral surface of the connecting pin.

A filling apparatus (100) according to the present invention having a storage tank for storing hydrogen fuel and a filling nozzle (10) for filling a hydrogen gas from the storage tank through a fuel filling system to an in-vehicle hydrogen filling tank mounted on a vehicle is characterized by including a rod-shaped member (2: connecting pin) and a main body portion (1) mounted on the filling nozzle (10); a sealing member (3: laminated sealing member) arranged on (a radially outer peripheral portion of) the main body portion (1); a guide member (4: pressing member) mounted on an end side (on a receptacle 20 side in an in-vehicle hydrogen filling tank) of the rod-shaped member (2); and means for protecting an outer peripheral surface of the rod-shaped member (2) from slide on the guide member (4).

Here, the means for protecting the outer peripheral surface of the rod-shaped member (2) from slide on the guide member (4: pressing member) can be a coating for a radially inner periphery surface of the guide member (4) with a material (resin, Al or Cu, for instance) whose hardness is lower than that of a material (for example, stainless steel) of the rod-shaped member (2). Or, the means can be a coating for the surface of the rod-shaped member (2) with a material (glass or carbon-based material, for instance) whose hardness is higher than that of a material (for example, stainless steel) of the guide member (4).

In the present invention, it is preferable to mount a valve element (2A) on the fuel filling system side end portion of the rod-shaped member (2: connecting pin), and an elastic material (5) for urging the valve element (2A) in a direction that a valve is closed.

At an implementation of the present invention, it is preferable that the filling apparatus includes a clutch mechanism (12) for maintaining a connected state between the filling nozzle (10) and the vehicle side filling port (20).

With the present invention with the above construction, radial movement of the rod-shaped member (2) (so-called "rattling") can be prevented by a periphery of a portion where the rod-shaped member (2) penetrates the main body portion (1) as well as the inner peripheral surface of the guide member (4: pressing member). Then, with the means for protecting the outer peripheral surface of the rod-shaped member (2) from slide on the guide member (4), even if opening and closing of the valve in the filling nozzle (10) are repeated, damages and deformations (recesses and so on) are not generated on a portion where the rod-shaped member (2) and the guide member (4) slide with each other, and even if the portion where the rod-shaped member (2) and the guide member (4) slide with each other locates on a radially inner side region of the laminated seal (3), on the surface of the rod-shaped member (2) do not exist damages and deformations, so that a gas (such as a hydrogen gas) does not leak out of the nozzle (10).

BRIEF DESCRIPTION OF THE DRAWINGS

FIG. 1 is across sectional view showing a pipe joint main body of a filling nozzle according to an embodiment of the present invention.

FIG. 2 is a cross sectional view showing a condition that the filling nozzle and the vehicle side filling port are connected with each other in the embodiment.

FIG. 3 is an enlarged view of the part pointed by the symbol F3 in FIG. 2.

FIG. 4 is an explanatory view of a conventional hydrogen filling apparatus.

DETAILED DESCRIPTION

Hereinafter, an embodiment of the present invention will be explained with reference to the attached drawings. The illustrated embodiment shows a condition that a hydrogen gas is filled. In FIG. 1, the numeral 10 shows a whole filling nozzle of a filling apparatus 100. The filling nozzle 10 fills a hydrogen gas from a hydrogen fuel storage tank not shown through a fuel filling system (having a dispenser 60, a filling hose 45 and so on, refer to FIG. 4) to an in-vehicle hydrogen filling tank. The filling nozzle 10 has a pipe joint main body 1 (main body portion 1), and on a central portion (a central portion in the vertical direction in FIG. 1) of a hydrogen supply source side (fuel filling system side: right side in FIG. 1) end portion of the main body portion 1 is formed a hydrogen introducing port 1B. On a receptacle side (on a vehicle side filling port side: left side in FIG. 1) end portion of the main body portion 1 is formed an opening 1C into which a receptacle 20 is inserted, and at filling of a hydrogen gas, the receptacle 20 is fitted in a receptacle insertion space 1D.

On a central portion in a vertical direction of the main body portion 1 is formed an in-main-body passage 1A, and the in-main-body passage 1A extends from the hydrogen introducing port 1B to the receptacle insertion space 1D. In the in-main-body passage 1A is accommodated a rod-shaped member (connecting pin) 2. On the end portion of the rod-shaped member 2 on the hydrogen supply source side (right side in FIG. 1) is attached a valve element 2A, which is accommodated in a valve element accommodating portion 1E of the in-main-body passage 1A. In the valve element accommodating portion 1E, on the hydrogen supply source side (right side in FIG. 1) of the valve element 2A is arranged a spring 5 as an elastic material. The valve element 2A, a valve seat 1M and the spring 5 constitute a valve mechanism. Here, the valve seat 1M is formed by a step portion at an end portion (left end portion in FIG. 1) of the valve element accommodating portion 1E.

The rod-shaped member 2 is slidable in the in-main-body passage 1A in a horizontal direction in FIG. 1, and in a condition that the filling nozzle 10 is not connected to the receptacle 20 (the condition shown in FIG. 1), the valve element 2A is urged by an elastically repulsive force of the spring 5 to the receptacle 20 side (left side in FIG. 1), and seats on the valve seat 1M, and the valve mechanism is in closed state. The rod-shaped member 2 (connecting pin) has a large diameter portion 2C, a small diameter portion 2D connected to the valve element 2A, and a diameter changing portion 2F for forming the opening 2E, and in the inside of the rod-shaped member 2 is formed an in-rod passage 2B (hollow portion). When a hydrogen gas is filled (refer to FIG. 2), the hydrogen gas flows from a dispenser (refer to FIG. 4) through the valve mechanism (the valve element 2A and so on) into the in-main-body passage 1A, and flows through the opening 2E of the diameter changing portion 2F of the rod-shaped member 2 into the in-rod passage 2B.

In FIG. 1, on the receptacle 20 side of the large diameter portion 2C of the rod-shaped member 2 (left side in FIG. 1) is integrally formed a rod enlarged portion 2T projecting in a radially outer direction. The outer peripheral surface of the rod enlarged portion 2T is slidable on the inner peripheral surface of the main body portion 1, and is formed to suppress radial movement (so-called "rattling") of the rod enlarged portion 2T. The rod enlarged portion 2T can be formed separately from the rod-shaped member 2. In addition, on the large diameter portion 2C of the rod-shaped member 2 is formed a step portion 2G, and when a hydrogen gas is filled (refer to FIG. 2), the step portion 2G positions near a step portion 1F of the main body portion 1. To the small diameter portion 2D of the rod-shaped member 2 is contacted a nut member 2H, and abutment of the nut member 2H with a convex portion 1G of the main body portion 1 prevents the rod-shaped member 2 from detaching on the receptacle side (left side in FIG. 1) at the filling of the hydrogen gas (refer to FIG. 2).

In FIG. 1, in a radially outer direction of the large diameter portion 2C of the rod-shaped member 2 is arranged a sealing member 3 (laminated sealing member: so-called "cup seal"). An inner diameter of the cup seal 3 is set to be almost the same as an outer diameter of the large diameter portion 2C (on the receptacle side (left side in FIG. 1) from the step portion 2G) of the rod-shaped member 2.

On a portion (right side in FIG. 1) apart from an end of the rod-shaped member 2, adjacent to the receptacle 20 side (left side in FIG. 1) of the cup seal 3 is mounted a guide member 4 (pressing member). The guide member 4 is fixed to a radially inner portion of the main body portion 1 with a male screw or the like, and projects in a radially inner direction. In FIG. 1, the symbol 4A indicates a male screw formed on the guide member 4. Inner diameter of the guide member 4 is set so as to allow portions of the rod-shaped member 2 other than the rod enlarged portion 2T to be slidable and to prevent radial movement (so-called "rattling") of the rod-shaped member 2. In non-filling state in FIG. 1, the rod enlarged portion 2T of the rod-shaped member 2 is apart from the guide member 4 in an axial direction of the rod (on the hydrogen supply source side), and in filling state shown in FIG. 2, the rod enlarged portion 2T abuts the guide member 4 (at an end on the receptacle 20 side). The guide member 4 has functions of supporting the rod-shaped member 2 at an end side (on the receptacle 20 side, left side in FIG. 1); restricting an axial position of the rod-shaped member 2 to prevent movement of the sealing member 3 on the receptacle 20 side; and positioning the rod-shaped member 2 so as not to move on the receptacle 20 side of the rod-shaped member 2 in filling state (right side in FIGS. 1 and 2).

At an end (on the receptacle 20 side) of the rod-shaped member 2 is mounted a tip member 6. The tip member 6 is fixed to an inner periphery of the main body portion 1 with a male screw or the like, projecting in a radially inner direction. The symbol 6A in FIG. 1 shows a male screw formed on the tip member 6. Inner diameter of the tip member 6 is set to allow portions of the rod-shaped member 2 other than the rod enlarged portion 2T to be slidable and to prevent radial movement of the rod-shaped member 2 (so-called "rattling"). In non-filling state in FIG. 1, the rod enlarged portion 2T of the rod-shaped member 2 is adjacent to hydrogen supply source side of the tip member 6 (right side in FIG. 1), and in filling state shown in FIG. 2, the rod enlarged portion 2T is separated from the tip member 6 and abuts the guide member 4.

The tip member 6 has functions of supporting the rod-shaped member 2 on the receptacle 20 side and preventing movement of the rod-shaped member 2 on the receptacle 20 side (left side in FIGS. 1 and 2) in non-filling state. A space S in FIG. 1 is a play of the rod enlarged portion 2T (or the rod-shaped member 2) between non-filling state (FIG. 1) and filling state (FIG. 2), that is, a play of the rod enlarged portion 2T at opening/closing of the valve mechanism (the valve element 2A and so on).

As shown in FIG. 2, when the main body portion 1 (nozzle 10) and the receptacle 20 are connected with each other, an engaging portion 21 (FIG. 1) on an end (receptacle 20 side) of the rod-shaped member 2 contacts an engaging portion 20C on an end side (nozzle 10 side) of the receptacle 20, and a whole rod-shaped member 2 moves from the position shown in FIG. 1 rightward in FIGS. 1 and 2 (in a direction separated from the receptacle 20). The numeral 21 shown in FIG. 2 indicates an O-ring, and the O-ring 21 has a function of preventing a hydrogen gas flowing from the in-rod passage 2B to an in-receptacle passage 20B from leaking when the nozzle 10 and the receptacle 20 are connected with each other. When the whole rod-shaped member 2 moves from the position shown in FIG. 1 rightward in FIGS. 1 and 2, the rod enlarged portion 2T of the rod-shaped member 2 moves to a position where the portion 2T contacts the guide member 4.

In accordance with rightward movement of the rod-shaped member 2, the valve element 2A mounted on an end of the rod-shaped member 2 separates from the valve seat 1M against the elastically repulsive force of the spring 5 to open the valve mechanism. Then, via the valve mechanism whose valve opens, a high pressure hydrogen gas flows from the hydrogen introducing port 1B, which is connected to the filling hose side, into the in-main-body passage 1A. The hydrogen gas flowing into the in-main-body passage 1A flows via the opening 2E of the rod-shaped member 2 and the in-rod passage 2B through the in-receptacle passage 20B, and is supplied to the in-vehicle hydrogen filling tank 41 (FIG. 4), which is not shown in FIG. 2.

In FIG. 2, when the hydrogen gas flows through the in-main-body passage 1A and the in-rod passage 2B, the hydrogen gas may flow into a clearance δ between an outer peripheral surface of the rod-shaped member 2 and an inner peripheral surface of the in-main-body passage 1A to leak outside the main body portion 1 without flowing from the opening 2E to the in-rod passage 2B of the rod-shaped member 2. In order to prevent the leakage of the hydrogen gas out of the main body portion 1 through the clearance δ, the cup seal 3 is arranged. Here, every time that the valve mechanism, which is constituted by the valve element 2A, a valve seat 1M and so on, of the rod-shaped member 2 opens or closes (hydrogen is filled), the rod-shaped member 2 slides on a region on a radially inner side (inner peripheral portion) of the guide member 4. The repeated slides of the rod-shaped member 2 cause damages and deformations (recesses and so on) on an outer peripheral surface of a portion R on which the rod-shaped member 2 slides. When the damages and deformations (recesses and so on) generate, portions of the rod-shaped member 2 on which the damages and the deformations generate locates on a radially inner region (inner peripheral portion) of the cup seal 3, and a hydrogen gas passes through the portions on which the damages and the deformations generate between the cup seal 3 and the rod-shaped member 2 to leak outside the main body portion 1 (nozzle 10).

In order to prevent a hydrogen gas from passing through the portions on which the damages and the deformations generate between the cup seal 3 and the rod-shaped member 2, in the illustrated filling apparatus 100 is mounted means for protecting the outer peripheral surface of the rod-shaped member 2 from slide on the guide member 4. The means for the protection is a coating on a radially inner side surface of the guide member 4 with a material (resin, Al or Cu, for instance) whose hardness is lower than that of a material (for example, stainless steel) of the rod-shaped member 2. Or, the means may be a coating on at least a surface of the portion R of the rod-shaped member 2 with a material (glass, carbon-based material for instance) whose hardness is higher than that of a material (for example, stainless steel) of the guide member 4.

The above protection means prevents, even if the valve mechanism (valve element 2A and so on) in the nozzle 10 repeatedly opens or closes, damages and deformations (recesses and so on) on the portion R where (the outer peripheral surface of) the rod-shaped member 2 and the guide member 4 slide with each other. Then, even if the portion R locates on the radially inner side region of the cup seal 3, since the damages and the deformations do not exist on the portion R, a hydrogen gas does not leak via a portion between the cup seal 3 and the rod-shaped member 2 outside the main body portion 1 (nozzle 10). A region (no symbol) on an outer peripheral surface of the rod-shaped member 2 where slides with a radially inner side (inner peripheral surface) of the tip member 6 is not positioned at a region on a radially inner side of the sealing member 3 at hydrogen filling (in open state of the valve mechanism). As a result, in a region on an outer peripheral surface of the rod-shaped member 2 where contacting with an inner peripheral surface of the tip member 6, no means for protecting an outer peripheral surface of the rod-shaped member 2 from the slide In the illustrated embodiment, in the main body portion 1, a portion opposing an outer peripheral surface of the large diameter portion 2C of the rod-shaped member 2, a portion opposing an outer peripheral surface of the nut member 2H of the rod-shaped member 2 and an inner peripheral surface of the guide member 4 prevent radial movement of the rod-shaped member 2 (so-called "rattling"). In addition, in the main body portion 1, an inner peripheral surface of the tip member 6 supported by an end of the rod-shaped member 2 on the receptacle 20 side (tip portion) and a portion opposing an outer peripheral surface of the rod enlarged portion 2T prevent radial movement of the rod-shaped member 2.

In the illustrated embodiment is mounted a clutch mechanism 12 for maintaining connected condition between the filling nozzle 10 and the receptacle 20 as the vehicle side socket. In FIG. 1, on a radially outer side of the in-main-body passage 1A, and on the receptacle 20 side (left side in FIG. 1) is mounted a clutch 13 with a hollow cylinder shape. In the clutch 13, an engaging portion 13A formed on an end portion on a hydrogen supply source side of the clutch 13 (right side in FIG. 1) is fitted to a clutch fitting channel 1J formed in the main body portion 1 and fixed thereto. On a receptacle side end portion (left side in FIG. 1) of the clutch 13 is mounted a swelling portion 13B, and the portion 13B is fitted into a fitting channel 20A of the receptacle 20 when the filling nozzle 10 and the receptacle 20 are connected with each other (at hydrogen filling: refer to FIG. 2).

On a radially outer side of the clutch 13 is mounted a lever 14. On the lever 14 is integrally formed a lever handle 14A, and moving the lever 14 in the arrow H direction by a worker not shown grasping the lever handle 14A causes an end of the lever 14 on the receptacle side (left side in FIG. 1) to be positioned at a radially outer side of the swelling portion 13B of the clutch 13, which prevents the swelling portion 13B of the clutch 13 from being disengaged from the fitting channel 20A of the receptacle 20. Then, moving an end of the lever 14 on the receptacle side rightward in the arrow H direction causes the end to be positioned so as to be disengaged from a radially outer side of the swelling portion 13B of the clutch 13, which allows the swelling portion 13B of the clutch 13 to be disengaged from the fitting channel 20A of the receptacle 20. In FIGS. 1 and 2, on the main body portion 1 are formed a lever opening portion 1K and a lever moving passage 1L, which permit movement of the lever 14 in the direction of the arrow H.

When the nozzle 10 and the receptacle 20 are connected with each other as shown in FIG. 2, in the clutch mechanism 12, a receptacle side end portion (left end portion in FIG. 2) of the lever 14 is supported at a position on a radially outer side of the swelling portion 13B of the clutch 13, which prevents the clutch 13 from being detached from the fitting channel 20A of the receptacle 20. In FIG. 2, the clutch mechanism 12 has a projection 14B (projection of the lever) and a ring-shaped elastic member 15 (O-ring, for instance). The projection 14B positions at an end of the lever 14 on the receptacle 20 side (left side in FIG. 2), projecting a radially inner direction. The elastic member 15 is disposed on the side apart from the receptacle 20 from the projection 14B (right side in FIG. 2), and is fitted to an elastic material channel 14C formed near the receptacle side end portion of the lever 14.

In the hydrogen filling state shown in FIG. 2, a hydrogen gas is filled at remarkably high pressure (70 MPa for instance), due to the pressure, a tensile force F1 separating the main body portion 1 from the receptacle 20 acts thereon. As a result, by an action between an inclined surface 13BA located on the hydrogen supply side (right side in FIG. 2) of the swelling portion 13B of the clutch 13 and an inclined surface 20AA located on the hydrogen supply side (right side in FIG. 2) of the receptacle engaging channel 20A, a radially outward force RO as a component force of the tensile force F1 acts on the clutch 13 to move the clutch 13 outward in a radial direction. However as described above, since the lever 14 positions in a radially outer direction of the swelling portion 13B, the clutch 13 does not move in radially outer direction from the lever 14.

As shown in FIG. 3 enlarging the part F3 in FIG. 2, when the clutch 13 moves outward in a radial direction by the radially outward force RO, the elastic member 15 is squeezed in a radial direction. As a result, the end surface 13BB of the swelling portion 13B of the clutch 13 and the end surface 14BA of the projection 14B of the lever 14 abut with each other in the region FT, so that the lever 14 cannot move from the condition shown in FIG. 3 toward the hydrogen supply source side, that is, rightward in FIGS. 2 and 3. The lever 14 consequently continues positioning radially outside of the swelling portion 13B of the clutch 13 to prevent the clutch 13 from moving radially outward, which causes the swelling portion 13B not to be disengaged from the fitting channel 20A of the receptacle 20, that is, disengagement of the main body portion 1 and the receptacle 20 can be prevented. To exhibit action effect described above is properly designed elastic coefficient of the elastic member 15; projecting amount of the elastic member 15 to the crutch 13; projecting amount of the projection 14B of the lever 14 to the crutch 13; inclination angle of the inclined surface 13BA of the swelling portion 13B (FIGS. 2 and 3); inclination angle of the inclined surface 20AA of the receptacle engaging channel 20A (FIGS. 2 and 3); and so on. In addition, in FIGS. 1 and 2, the numeral 16 indicates a lever position moving mechanism for locating the lever 14 radially outside of the receptacle 20 side end of the clutch mechanism 12 when the filing nozzle 10 and the receptacle 20 are connected with each other.

In FIGS. 2 and 3, when filling hydrogen gas is finished and a predetermined depressurizing work is completed, the tensile force F1 resulting from high pressure of the hydrogen gas disappears. The radially outward force RO acting on the clutch 13 accordingly disappears to allow the clutch 13 to return to a radially inner position (position before hydrogen gas is filled). The ring-shaped elastic member 15 mounted adjacent to an end of the lever 14 returns to a cross-sectionally circular shape from the squeezed shape shown in FIG. 3 as a result, and the end surface 13BB and the end surface 14BA do not contact with each other, and the lever 14 becomes movable toward the hydrogen supply side (rightward in FIGS. 2 and 3). When the lever 14 moves toward the hydrogen supply side (rightward in FIGS. 2 and 3), the lever 14 does not position outward the swelling portion 13B of the clutch 13 in a radial direction, which allows the swelling portion 13B of the clutch 13 to move radially outward and detach from the engaging channel 20A of the receptacle 20, and the connection between the main body portion 1 (filling nozzle 10) and the receptacle 20 can be released.

With the filling apparatus 100 according to the embodiment shown in the drawings, in the main body portion 1 inside of which the rod-shaped member 2 is slidable, a portion opposing an outer peripheral surface of the large diameter portion 2C of the rod-shaped member 2, a portion opposing an outer peripheral surface of the nut member 2H of the rod-shaped member 2, an inner peripheral surface of the guide member 4, an inner peripheral surface of the tip member 6 and a portion opposing an outer peripheral surface of the rod enlarged portion 2T prevent radial movement of the rod-shaped member 2 (so-called "rattling"). In addition, in the embodiment shown in the drawings, the means for protecting the outer peripheral surface of the rod-shaped member 2 from slide on the guide member 4 is provided. The means is a coating of the radially inner peripheral surface of the guide member 4 with a material (resin, Al, Cu for instance) whose hardness is lower than that of a material (stainless steel for instance) of the rod-shaped member 2, or a coating of at least the portion R (where the guide member 4 slides as shown in FIG. 2) of the rod-shaped member 2 with a material (glass, carbon-based material for instance) whose hardness is higher than that of a material (stainless steel for instance) of the guide member 4. Therefore, even if opening and closing of the valve mechanism (valve element 2A, valve seat 1M, and so on) are repeated through a number of hydrogen filling with the filling nozzle 10, on the portion R where the outer peripheral surface of the rod-shaped member 2 slides on the guide member 4 are not generated damages and deformations (recesses and the like), even if the portion R locates on the radially inner side of the cup seal 3, a hydrogen gas does not leak out of the main body portion 1 (nozzle 10).

In addition, in the illustrated embodiment, under the condition that the filling nozzle 10 and the receptacle 20 (vehicle side filling port) are connected with each other, the valve element 2A of the rod-shaped member 2 separates from the valve seat 1M; the valve mechanism opens to open the passage between the hydrogen introducing port 1B and the receptacle 20 (vehicle side filling port); and then it becomes possible to fill a hydrogen gas, so it is safe. In the illustrated embodiment is mounted the clutch mechanism 12 for maintaining the connected condition between the filling nozzle 10 and the receptacle 20 (vehicle side filling port), so that when hydrogen is filled, the component force RO of the tensile force F1 cause the clutch 13 to radially deform the elastic member 15, which allows the end surface 13BB of the swelling portion 13B of the clutch 13 and the end surface 14BA of the projection 14B of the lever 14 abut with each other, so that the lever 14 cannot safely move in a direction apart from the receptacle 20. Since the clutch mechanism 12 is a mechanical mechanism, and is not operated by a fluid such as a hydrogen gas, it is not necessary to separately mount a fluid circuit, a sealing structure for an operating fluid, and so on. Therefore, there is no possibility that an operation gas (a hydrogen gas and so on) leaks, and certain operation is maintained.

Since the embodiment shown in the drawings are merely example, and the embodiment does not limit the technical scope of the present invention. For example, although a hydrogen gas is filled in the illustrated embodiment, the present invention can be applied to a CNG filling apparatus.

DESCRIPTION OF THE REFERENCE NUMERALS 1 main body portion
2 rod-shaped member (connecting pin)
2A valve element
2T rod enlarged portion
3 coupling (sealing member)
4 guide member (pressing member)
5 spring (elastic material)
6 tip member (sealing member)
10 filling nozzle
12 clutch mechanism
20 receptacle
100 filling apparatus

The invention claimed is:

1. A filling apparatus comprising:
a storage tank for storing hydrogen gas;
a filling nozzle for filling hydrogen gas from the storage tank through a fuel filling system to an in-vehicle hydrogen filling tank mounted on a vehicle;
a rod-shaped member and a main body portion mounted on the filling nozzle;
a sealing member arranged on the main body portion;
a guide member projecting in a radially inner direction from the main body portion toward the rod-shaped member on a portion separated from an end side of the rod-shaped member, the guide member being configured to be positionable in abutment with the rod-shaped member; and
means for protecting an outer peripheral surface of the rod-shaped member from sliding on the guide member.

2. The filling apparatus as claimed in claim 1, wherein the means for protecting the outer peripheral surface of the rod-shaped member from slide on the guide member is a coating for a radially inner peripheral surface of the guide member with a material whose hardness is lower than that of a material of the rod-shaped member.

3. The filling apparatus as claimed in claim 1, further comprising: a valve element mounted on a fuel filling system side end portion of the rod-shaped member, and an elastic material for urging the valve element in a direction that the valve element assumes a closed position to restrict fluid flow through the main body portion.

4. The filling apparatus as claimed in claim 1, further comprising a clutch mechanism for maintaining a connected state between the filling nozzle and a vehicle side filling port.

5. The filling apparatus as claimed in claim 1, wherein the rod-shaped member is moveable relative to the main body portion between an open position and a closed position, and movement of the rod-shaped member from the closed position toward the open position allows for fluid flow through the main body portion.

6. The filling apparatus as claimed in claim 2, further comprising: a valve element mounted on a fuel filling system side end portion of the rod-shaped member, and an elastic material for urging the valve element in a direction that the valve element assumes a closed position to restrict fluid flow through the main body portion.

7. The filling apparatus as claimed in claim 2, further comprising a clutch mechanism for maintaining a connected state between the filling nozzle and a vehicle side filling port.

8. The filling apparatus as claimed in claim 3, further comprising a clutch mechanism for maintaining a connected state between the filling nozzle and a vehicle side filling port.

9. The filling apparatus as claimed in claim 5, wherein the rod-shaped member and the guide member are configured such that the guide member is in abutment when the rod-shaped member when the rod-shaped member is in the open position.

10. The filling apparatus as claimed in claim 5, wherein the rod-shaped member includes a main portion and an enlarged portion extending radially outward from the main portion.

11. The filling apparatus as claimed in claim 10, wherein the enlarged portion is configured to be separated from the guide member when the rod-shaped member is in the closed position.

* * * * *